Dec. 9, 1947. G. V. GLUMER 2,432,473
LOCK NUT
Filed Jan. 4, 1945
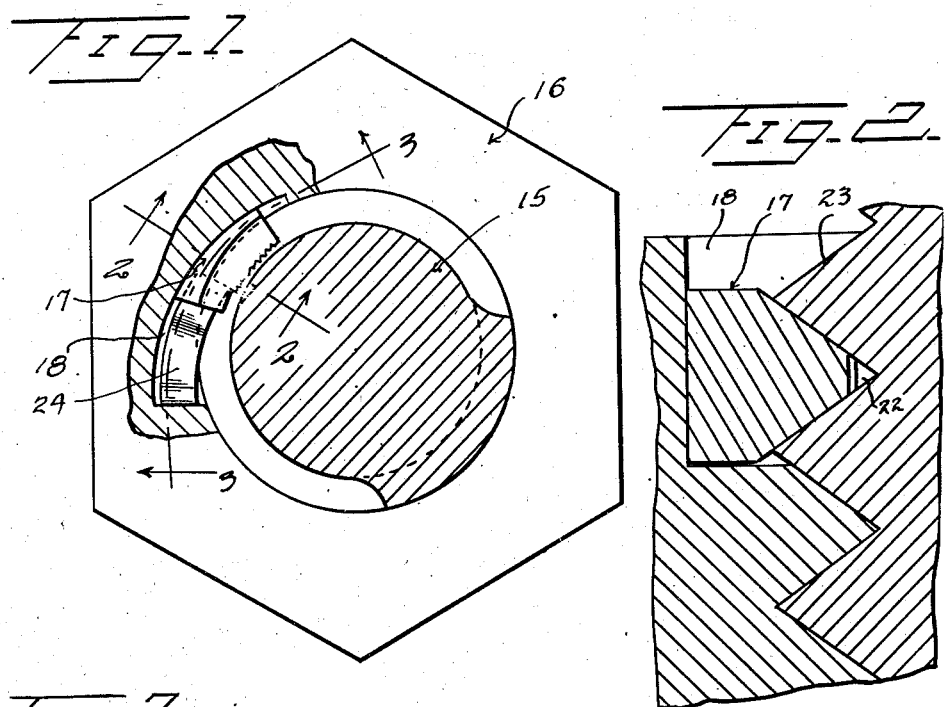
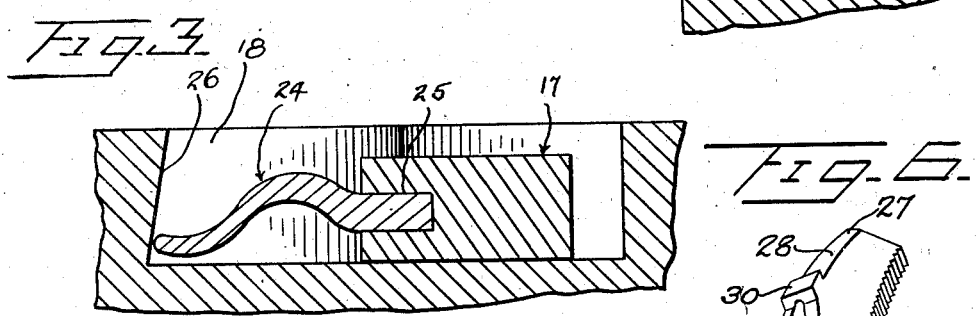
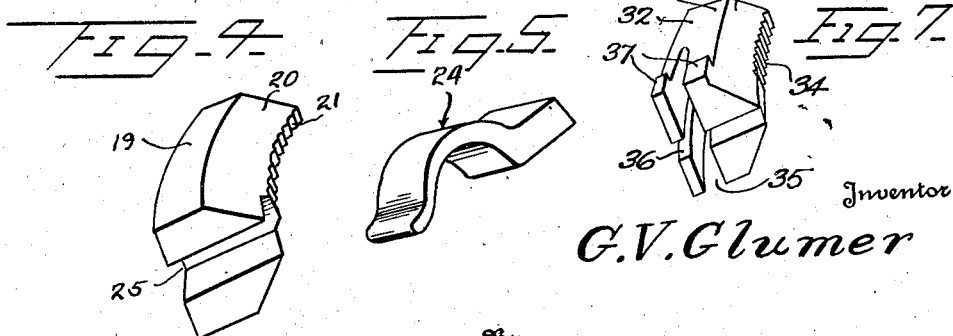
Inventor
G. V. Glumer
By Kimmel & Crowell Attorneys Patented Dec. 9, 1947

2,432,473

UNITED STATES PATENT OFFICE 2,432,473

LOCK NUT

Gustavo Vasquez Glumer, Mexico City, Mexico

Application January 4, 1945, Serial No. 571,339
In Mexico February 15, 1944

2 Claims. (Cl. 151—25)

This invention relates to certain useful improvements in eccentric wedges and split washers, to be used in connection with improved safety non-loosening nuts.

The invention aims to provide in a manner as hereinafter set forth, an eccentric wedge and an eccentric split washer of improved design and construction, to be used in connection with improved safety non-loosening nuts, of the kind employed in mechanical structures subject to major strains, vibrations or special safety conditions, as such wedges and split washers of improved design, make impossible any involuntary displacement of the same, thus not allowing any loosening of the nut in which these devices are being used, once said wedge or split washer have been locked in their working position.

A further object of this invention is to provide in a manner as hereinafter set forth, a wedge and split washer of special design and construction which allow the safety nut in which they are being used, to maintain its locking position, notwithstanding any wear of the mechanical surfaces which are being united by this safety device, as once this eccentric wedge or split washer have been displaced to their locking position, their improved design will keep locked indefinitely, until they have been voluntarily released.

A further object of this invention is to provide in a manner as hereinafter set forth, safety and eccentric wedges and split washers which, used in connection with improved safety nuts, provide a permanent joint of the mechanical parts in which this safety non-loosening nut is being used, especially if said parts are subject to strenuous condition or vibration, excessive wear or mechanical effort, and when a greater margin of safety is needed.

Another object of this invention, is to provide in a manner as hereinafter set forth, eccentric wedges and split washer of improved design and construction, which make possible their use in connection with safety non-loosening nuts, without altering their exterior shape and size, or the construction of the screw thread, thus providing a safety locking assembly of improved design which may be used on conventional bolts without the need of special tools or additional devices, in consideration of the relative position of the composing parts of said assembly, which provides a progressive and constant adjustment of said parts.

With these and other objects which may hereinafter appear, the invention consists in the improved design, construction, arrangement and combination of parts as will be more specifically described and illustrated in the accompanying drawings, in which is shown an embodiment of the invention; but it is to be understood that changes, variations and modifications may be resorted to which fall within the scope of the invention as claimed.

In the drawings,

Figure 1 is an end view partly in section of a nut lock construction according to the embodiment of this invention, Figure 2 is a fragmental sectional view taken on line 2—2 of Figure 1, Figure 3 is a fragmental sectional view taken on line 3—3 of Figure 1, Figure 4 is a perspective view of the locking wedge, Figure 5 is a perspective view of the wedge spring, Figure 6 is a perspective view of a modified form of the locking wedge, Figure 7 is a perspective view of another modified form of the locking wedge.

Referring to drawings and first to Figures 1 to 5 inclusive, the numeral 15 designates generally a bolt having a nut 16 threaded thereon. In order to provide a means whereby the nut 16 will be held against reverse rotation, I have provided a nut lock, generally designated as 17. The nut 16 is formed with an eccentric or cam recess 18 opening through the outer face thereof, and confronting of the threads of the bolt 15.

The nut lock 17 comprises an elongated longitudinally curved body 19 which is formed with a truncated triangular thread engager 20. The body 19 is a tapering or wedge lock configuration and the apex of the thread engaging portion 20 is formed with serrations or teeth 21. The locking member 20 is truncated so that the apex thereof will be disposed outwardly from the root 22 of the threads 23 of the bolt. In this manner the inner edge of the locking member 20 will at no time engage in the bottom of the root when it is in locking position. The teeth 21 are provided so that the opposite ends thereof may bite into the sides of the thread during the wedging action.

The locking member 17 is constantly urged to locking position by means of a bowed spring 24. The spring 24 is seated at one end in a recess 25 formed in the large end of the locking wedge or member 17 and the opposite end of the spring 24 bears against the inclined wall 26 of the recess 18. This wall 26 is inclined to the longitudinal axis of the nut 16, being inclined outwardly and inwardly toward the axis so that the pressure of the spring 24 against the wall 26 will tend to retain the free end of the spring within the recess 18.

Referring now to Figure 6, there is disclosed a modified form of wedge lock 27 which is similar to wedge lock 17 with the exception that the tapered body 28 thereof is formed with a slot 29 disposed at right angles with respect to slot 25. The spring 24 may be seated in the slot 29 in the same manner as the spring 24 is seated in the slot 25. In order to provide a means whereby the wedge lock may be manually moved to released position, releasing lug 30 is carried by the body 28 on its outer side and is adapted to be engaged by a tool for manually shifting wedge member 27 toward the deep end of the eccentric or cam recess 18.

In Figure 7 there is disclosed another modification of the locking wedge generally designated as 31. This locking wedge 31 is formed with a tapering body 32 similar to body 19, and also carries a truncated triangular locking portion 33 formed with serrations 34 on the apex thereof, and body 32 is formed with a slot 35 similar to slot 29, and is also formed with a slot 36 which extends through the locking member 33. In this manner the spring 24 may be disposed in either one of the slots 35 or 36. A split releasing lug 37 is carried by the large end of the body 32 and is adapted by engagement of a releasing tool for moving the wedge lock to the large end of the cam or eccentric recess.

In the use and operation of this locking nut, the nut 16 may be rotated in a clockwise direction so as to thread the nut on the bolt 15. During this threading operation the spring 24 will constantly push the wedge member 17 forwardly to the shallow end of recess 18, but the friction of the locking wedge 17 will tend to move this wedge member in a counter-clockwise direction toward the large end of the recess 18. In this manner the nut 16 may be freely rotated to thread same on the bolt 15. However, reverse rotation of the nut 16 will be prevented as the spring 24 will push the wedge 17 forwardly in a clockwise direction and thereby effect the tight binding of the tapered sides of the locking portion 20 against the divergent sides of the threads 23.

What I claim is:

1. A nut lock comprising a nut formed with a cam-shaped recess extending from the threaded opening therein, and a locking wedge engaging in said recess, said wedge being formed of a longitudinally arcuate member having the configuration of a truncated V in transverse section and adapted to engage in the valley of a bolt thread, said arcuate member including a tapered outer cam member, said wedge having a slot in the large end thereof, a resilient longitudinally bent member having one end thereof disposed in said slot and the other end abutting against the large end of said recess and adapted to normally resist movement of said wedge toward the large end of said recess, and a releasing lug extending laterally from the large end of said wedge whereby said wedge may be forcibly moved against the tension of said resilient member to released position.

2. A nut lock comprising a nut formed with a cam-shaped recess extending from the threaded opening therein, and a locking wedge engaging in said recess, said wedge being formed of a longitudinally arcuate member having the configuration of a truncated V in transverse section and adapted to engage in the valley of a bolt thread, said arcuate member including a tapered outer cam member, said wedge having a slot in the large end thereof, and a resilient longitudinally bent member having one end thereof disposed in said slot and the other end abutting against the large end of said recess and adapted to normally resist movement of said wedge toward the large end of said recess, said outer cam member being formed with a lengthwise slot intersecting said first named slot whereby to form a pair of resilient arms.

GUSTAVO VASQUEZ GLUMER.

REFERENCES CITED

The following references are of record in the file of this patent:

UNITED STATES PATENTS

| Number | Name | Date |
| --- | --- | --- |
| 1,352,090 | Schnell | Sept. 7, 1920 |
| 805,829 | Wrisberg | Nov. 28, 1905 |
| 550,975 | Isackson | Dec. 10, 1895 |

FOREIGN PATENTS

| Number | Country | Date |
| --- | --- | --- |
| 75,181 | Switzerland | Nov. 22, 1916 |